United States Patent
Holmes-Higgin et al.

(10) Patent No.: US 12,361,016 B2
(45) Date of Patent: *Jul. 15, 2025

(54) HYBRID WORKFLOW SYNCHRONIZATION BETWEEN CLOUD AND ON-PREMISE SYSTEMS IN A CONTENT MANAGEMENT SYSTEM

(71) Applicant: HYLAND UK OPERATIONS LIMITED, Maidenhead (GB)

(72) Inventors: Paul Holmes-Higgin, Guildford (GB); Frederik Heremans, Maidenhead (GB); Tijs Rademakers, Maidenhead (GB); Joram Barrez, Brussels (BE)

(73) Assignee: Hyland UK Operations Limited, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,580

(22) Filed: Jul. 7, 2023

(65) Prior Publication Data

US 2024/0004899 A1    Jan. 4, 2024

Related U.S. Application Data

(63) Continuation of application No. 17/579,864, filed on Jan. 20, 2022, now Pat. No. 11,727,035, which is a
(Continued)

(51) Int. Cl.
*G06F 16/27*      (2019.01)
*G06F 16/178*      (2019.01)
(Continued)

(52) U.S. Cl.
CPC ............ *G06F 16/27* (2019.01); *G06F 16/178* (2019.01); *G06F 16/275* (2019.01); *H04L 63/02* (2013.01); *H04L 63/10* (2013.01); *H04L 67/1095* (2013.01)

(58) Field of Classification Search
CPC ...... G06F 16/27; G06F 16/275; G06F 16/178; G06F 8/61; H04L 63/02; H04L 63/10; H04L 67/1095
See application file for complete search history.

(56) References Cited

U.S. PATENT DOCUMENTS 7,949,711 B2 *   5/2011   Chang ................... H04L 67/565
                                                              707/758
8,892,679 B1 *   11/2014   Destagnol ............. H04L 65/403
                                                              709/212

(Continued)

*Primary Examiner* — Mark E Hershley

(74) *Attorney, Agent, or Firm* — Eschweiler & Potashnik, LLC

(57) ABSTRACT

A workflow executed by a local platform of the content management system can include a remote workflow and a local workflow relating to local content retained in a local repository managed by the local platform of the content management system. A synchronization can be initiated between the local content and a remote copy of the local content to reflect a change to either of the local content or the remote copy in the other of the local content and the remote copy. The remote copy can exist at a location managed by a remote platform of the content management system. Upon detection that the remote workflow has been completed by the location using the remote copy, a resumption of the local workflow can be triggered using the synchronization between the local content and the remote copy of the local content. Related systems, methods, products, etc. are described.

19 Claims, 5 Drawing Sheets

Related U.S. Application Data continuation of application No. 15/614,506, filed on Jun. 5, 2017, now Pat. No. 11,256,711, which is a continuation of application No. 14/170,323, filed on Jan. 31, 2014, now Pat. No. 9,672,261.

(60) Provisional application No. 61/887,277, filed on Oct. 4, 2013.

(51) Int. Cl.
*H04L 9/40* (2022.01)
*H04L 67/1095* (2022.01)

(56) References Cited

U.S. PATENT DOCUMENTS

| | | | | |
|---|---|---|---|---|
| 9,213,718 | B1* | 12/2015 | Hrebicek | H04L 67/1095 |
| 9,349,123 | B1* | 5/2016 | McNamara | H04L 67/01 |
| 9,465,856 | B2* | 10/2016 | Branton | G06F 16/275 |
| 9,652,741 | B2* | 5/2017 | Goldberg | G06F 16/178 |
| 9,773,051 | B2* | 9/2017 | Smith | G06F 16/1787 |
| 9,811,532 | B2* | 11/2017 | Parkison | G06F 3/0635 |
| 9,811,662 | B2* | 11/2017 | Sharpe | G06F 16/183 |
| 10,503,822 | B1* | 12/2019 | Spencer | G06F 40/197 |
| 2002/0065879 | A1* | 5/2002 | Ambrose | G06F 9/54 |
| | | | | 719/315 |
| 2003/0137536 | A1* | 7/2003 | Hugh | G06F 16/273 |
| | | | | 715/744 |
| 2003/0227487 | A1* | 12/2003 | Hugh | G06F 16/9024 |
| | | | | 707/E17.011 |
| 2005/0038687 | A1* | 2/2005 | Galdes | G06Q 10/107 |
| | | | | 709/206 |
| 2005/0071589 | A1* | 3/2005 | Tross | G06F 11/2069 |
| | | | | 711/162 |
| 2008/0243846 | A1* | 10/2008 | Rasmussen | G06F 16/1774 |
| 2009/0132534 | A1* | 5/2009 | Yao | G06F 16/275 |
| 2009/0172101 | A1* | 7/2009 | Arthursson | G06F 3/0486 |
| | | | | 709/205 |
| 2010/0153482 | A1* | 6/2010 | Kim | H04L 67/1097 |
| | | | | 709/201 |
| 2010/0312850 | A1* | 12/2010 | Deshpande | G06F 12/1009 |
| | | | | 709/216 |
| 2011/0066668 | A1* | 3/2011 | Guarraci | G06F 16/27 |
| | | | | 707/831 |
| 2011/0110568 | A1* | 5/2011 | Vesper | G06Q 10/10 |
| | | | | 382/128 |
| 2011/0137991 | A1* | 6/2011 | Russell | G06Q 10/06 |
| | | | | 709/204 |
| 2012/0131656 | A1* | 5/2012 | Slaton | H04W 12/068 |
| | | | | 726/6 |
| 2012/0148115 | A1 | 6/2012 | Birdwell et al. | |
| 2012/0166516 | A1* | 6/2012 | Simmons | G06F 16/188 |
| | | | | 709/202 |
| 2012/0190386 | A1* | 7/2012 | Anderson | G01S 19/14 |
| | | | | 455/456.3 |
| 2012/0203908 | A1* | 8/2012 | Beaty | G06F 9/5072 |
| | | | | 709/226 |
| 2012/0204169 | A1* | 8/2012 | Breiter | G06F 9/44526 |
| | | | | 717/171 |
| 2012/0204187 | A1* | 8/2012 | Breiter | G06F 9/5072 |
| | | | | 718/105 |
| 2012/0209947 | A1* | 8/2012 | Glaser | G06F 9/5027 |
| | | | | 709/217 |
| 2012/0278439 | A1* | 11/2012 | Ahiska | A63F 13/77 |
| | | | | 709/218 |
| 2013/0013560 | A1* | 1/2013 | Goldberg | G06F 16/178 |
| | | | | 707/634 |
| 2013/0031155 | A1* | 1/2013 | Terrano | H04L 67/06 |
| | | | | 709/201 |
| 2013/0097687 | A1 | 4/2013 | Storm | |
| 2013/0103911 | A1* | 4/2013 | Bulut | G06F 12/0866 |
| | | | | 711/144 |
| 2013/0111336 | A1* | 5/2013 | Dorman | G06F 9/4843 |
| | | | | 715/255 |
| 2013/0124638 | A1* | 5/2013 | Barreto | G06F 16/27 |
| | | | | 709/205 |
| 2013/0179947 | A1* | 7/2013 | Kline, III | H04L 63/0892 |
| | | | | 726/4 |
| 2013/0212067 | A1* | 8/2013 | Piasecki | G06F 16/1787 |
| | | | | 707/620 |
| 2013/0212200 | A1* | 8/2013 | Dennis | H04L 67/1095 |
| | | | | 709/206 |
| 2013/0226876 | A1* | 8/2013 | Gati | G06F 16/184 |
| | | | | 707/652 |
| 2013/0238564 | A1* | 9/2013 | Tucker | G06F 11/2097 |
| | | | | 707/656 |
| 2013/0268357 | A1* | 10/2013 | Heath | G06Q 10/10 |
| | | | | 726/26 |
| 2013/0297700 | A1* | 11/2013 | Hayton | G06Q 10/10 |
| | | | | 709/204 |
| 2013/0298061 | A1* | 11/2013 | Bimson | G06F 3/0482 |
| | | | | 715/771 |
| 2013/0325622 | A1* | 12/2013 | Kamitani | G06Q 30/0267 |
| | | | | 705/14.64 |
| 2014/0006350 | A1* | 1/2014 | Fukui | G06F 16/178 |
| | | | | 707/632 |
| 2014/0006354 | A1* | 1/2014 | Parkison | G06F 3/0635 |
| | | | | 707/661 |
| 2014/0006465 | A1* | 1/2014 | Davis | G06F 16/1752 |
| | | | | 707/827 |
| 2014/0007239 | A1* | 1/2014 | Sharpe | G06F 16/183 |
| | | | | 726/24 |
| 2014/0019497 | A1* | 1/2014 | Cidon | G06F 16/182 |
| | | | | 707/827 |
| 2014/0026182 | A1* | 1/2014 | Pearl | H04L 63/20 |
| | | | | 726/1 |
| 2014/0040182 | A1 | 2/2014 | Gilder et al. | |
| 2014/0052825 | A1* | 2/2014 | Luecke | H04L 67/61 |
| | | | | 709/219 |
| 2014/0059002 | A1* | 2/2014 | Lockhart | G06F 16/178 |
| | | | | 707/622 |
| 2014/0068254 | A1* | 3/2014 | Scharf | H04L 9/0894 |
| | | | | 713/165 |
| 2014/0068588 | A1* | 3/2014 | Tan | G06F 8/656 |
| | | | | 717/169 |
| 2014/0074788 | A1* | 3/2014 | Chatterjee | H04L 67/10 |
| | | | | 707/639 |
| 2014/0075518 | A1* | 3/2014 | D'Souza | H04L 9/0833 |
| | | | | 726/4 |
| 2014/0115329 | A1* | 4/2014 | Sturonas | H04L 9/0822 |
| | | | | 713/165 |
| 2014/0136635 | A1* | 5/2014 | Jeng | H04L 51/42 |
| | | | | 709/206 |
| 2014/0149794 | A1* | 5/2014 | Shetty | G06F 16/951 |
| | | | | 709/213 |
| 2014/0164315 | A1* | 6/2014 | Golshan | G06F 16/93 |
| | | | | 707/608 |
| 2014/0223507 | A1* | 8/2014 | Xu | H04L 67/10 |
| | | | | 726/1 |
| 2014/0279873 | A1* | 9/2014 | Somerfield | G06F 16/172 |
| | | | | 707/610 |
| 2014/0281875 | A1* | 9/2014 | Branton | G06F 40/169 |
| | | | | 715/230 |
| 2014/0282525 | A1* | 9/2014 | Sapuram | H04L 43/062 |
| | | | | 718/1 |
| 2014/0325622 | A1 | 10/2014 | Luk et al. | |
| 2014/0379648 | A1* | 12/2014 | Chiu | G06F 16/113 |
| | | | | 707/624 |
| 2015/0012488 | A1* | 1/2015 | van Rossum | G06F 16/1767 |
| | | | | 707/611 |
| 2015/0012565 | A1* | 1/2015 | Engberg | G06F 16/25 |
| | | | | 707/783 |
| 2015/0100547 | A1* | 4/2015 | Holmes-Higgin | G06F 16/275 |
| | | | | 707/610 |
| 2015/0100548 | A1* | 4/2015 | Mc Erlean | G06F 8/61 |
| | | | | 707/610 |

(56) References Cited

U.S. PATENT DOCUMENTS

2015/0101021 A1* 4/2015 Mc Erlean ............ G06F 16/275
707/625
2016/0234189 A1* 8/2016 Storm ..................... H04L 63/08

* cited by examiner

HYBRID WORKFLOW SYNCHRONIZATION BETWEEN CLOUD AND ON-PREMISE SYSTEMS IN A CONTENT MANAGEMENT SYSTEM

CROSS-REFERENCE TO RELATED APPLICATION

The current application is a Continuation Application of U.S. Non-Provisional application Ser. No. 17/579,864 filed on Jan. 20, 2022, which is a Continuation Application of U.S. Non-Provisional application Ser. No. 15/614,506 filed on Jun. 5, 2017, which is a Continuation Application of U.S. Non-Provisional application Ser. No. 14/170,323 filed on Jan. 31, 2014, which claims priority under 35 U.S.C. § 119(e) to U.S. Provisional Patent Application No. 61/887,277 filed on Oct. 4, 2013. The disclosures of the above applications are hereby incorporated by reference herein in their entirety.

TECHNICAL FIELD

The subject matter described herein relates generally to content management systems.

BACKGROUND

Enterprise Content Management (ECM) relates to systems and methods to generate, store, manage and share content related to organizational processes of an enterprise. The content can be embodied in a paper document, an electronic file, a database, a message exchange or an email, among others. In modern ECM systems, the content is typically stored and managed as electronic, digital data on a single platform or installation.

Enterprise content management (ECM) covers a broad range of applications, including document management (DM), Web content management (WCM), records management (RM), digital asset management (DAM), search of managed content, and the like. A content management system (CMS) suitable for managing the various content (also referred to herein generically as "files") that an enterprise produces or generates, retains or otherwise stores, manipulates or modifies, etc. can support the requirements of one or more of such applications, and optionally other requirements, to provide a coherent solution in which content and management processes are capable of accessing content across a variety of applications subject to access controls, permissions, and the like. Content managed by a CMS can include one or more of documents, images, photos, Web pages, records, XML documents, other unstructured or semi-structured files, etc. An "enterprise" can generally refer to an organization, such as for example a business, a foundation, a university, or the like, and can have content requirements related to one or more business processes, content uses, etc.

A CMS manages the actual digital binary content, metadata or other record that describes a context or content object of each content item, associations between a content item and other content or content items, a place and classification of a content item in a repository, indexes for finding and accessing content items, etc. The CMS can manage processes and lifecycles of content items to ensure that this information is correct. The CMS can also manage one or more workflows for capturing, storing, and distributing content, as well as the lifecycle for how long content will be retained and what happens after that retention period.

Conventional ECM and CMS platforms deliver collaboration and control in an organization by managing workflows of millions of documents, complex processes and potentially thousands of users, but are suited for local or on-premise workflows, i.e. on the organization's network within a firewall. Today however, new mobile computing devices, remote or cloud-based working styles and an expanding network of external contractors, agencies and suppliers, which are considered part of a distributed computing architecture called the cloud, create new issues and challenges for ECM system in managing collaboration between local (on-premise) and remote (cloud-based) workflows. For instance, content cannot be pushed from the remote to a local workflow through a firewall, only pulled from the remote by the local system. Further, using conventional polling mechanisms between a local workflow and a remote workflow risks potential timing issues. These and other issues present serious challenges for effective collaboration and control and process automation.

SUMMARY

As discussed in greater detail below, features of the current subject matter can enable synchronization between local workflow and a remote workflow, including synchronization of both content and metadata.

In one aspect, a method includes the step of executing a workflow by one or more processors associated with a local platform (e.g., installation) of a content management system. The workflow includes a remote workflow and a local workflow relating to local content retained in a local repository managed by the local platform of the content management system. The method further includes the step of determining, by the one or more processors, a destination for a remote copy of the local content. The destination includes a location, such as a tenant, site or folder, managed by a remote platform of the content management system, and where the local platform of the content management system is protected from access by external users by a firewall, and the location is outside of the firewall. The method further includes the step of initiating, by the one or more processors, a synchronization between the local content and the remote copy of the local content. The synchronization includes reflecting a change to either of the local content or the remote copy in the other of the local content and the remote copy, where the change includes a content change and a metadata change.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other content management software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As referred to herein, a CMS generally includes at least one programmable processor executing some form of machine-readable instructions (e.g. software code, etc.) to provide one or more content management functions. The term firewall is generally used throughout this disclosure to refer to network security controls, features, functionality, etc. that restrict access to users outside of the firewall to content retained on one or more repositories inside of that firewall.

Various implementations of the current subject matter can, among other possible benefits and advantages, provide a method for partitioning, distributing and isolating workflow components of a distributed (i.e. multi-party) workflow, some of which exists across a firewall, while maintaining content and metadata synchronization. A workflow is a sequence of connected tasks applied to a document or other item of content. Each task can be performed by a person, a group, or automatically by a part of a local or remote CMS. A workflow is defined by a workflow model and definition, which can be pushed to a remote platform or a remote-based platform of a CMS, such as a multi-tenant system and repository. A "hybrid workflow" includes a remote workflow and a local workflow relating to local content retained in a local repository managed by the local platform of the CMS.

Services and controls for managing content of a CMS consistent with implementations of the current subject matter can include features such as metadata management, version control, lifecycle management, workflow, search, associations to other content, tagging, commenting, etc. that allow users of the CMS to find desired content items among very large content collections that can span multiple parts of an enterprise. Accuracy and consistency of the information can also be ensured, even for very large content collections across an enterprise. Content and other information in a CMS can be presented, published, etc. through the Web or any other channel appropriate to allow users to access that information.

In addition to supporting features typical of a remote or "software as a service (SaaS) software delivery model, a synchronization scheme consistent with the descriptions provided here can provide a number of desirable features. For example, the current subject matter can support automatic synchronization of content between one or more CMS-managed repositories that are inside of a firewall and a copy of one or more content items that are made accessible to authorized collaborating users of location, such as a defined collaboration site, in the remote. Such features can enhance ease of engagement and collaboration both between users within an organization and other collaborating users who are external to the organization.

Figure 1:
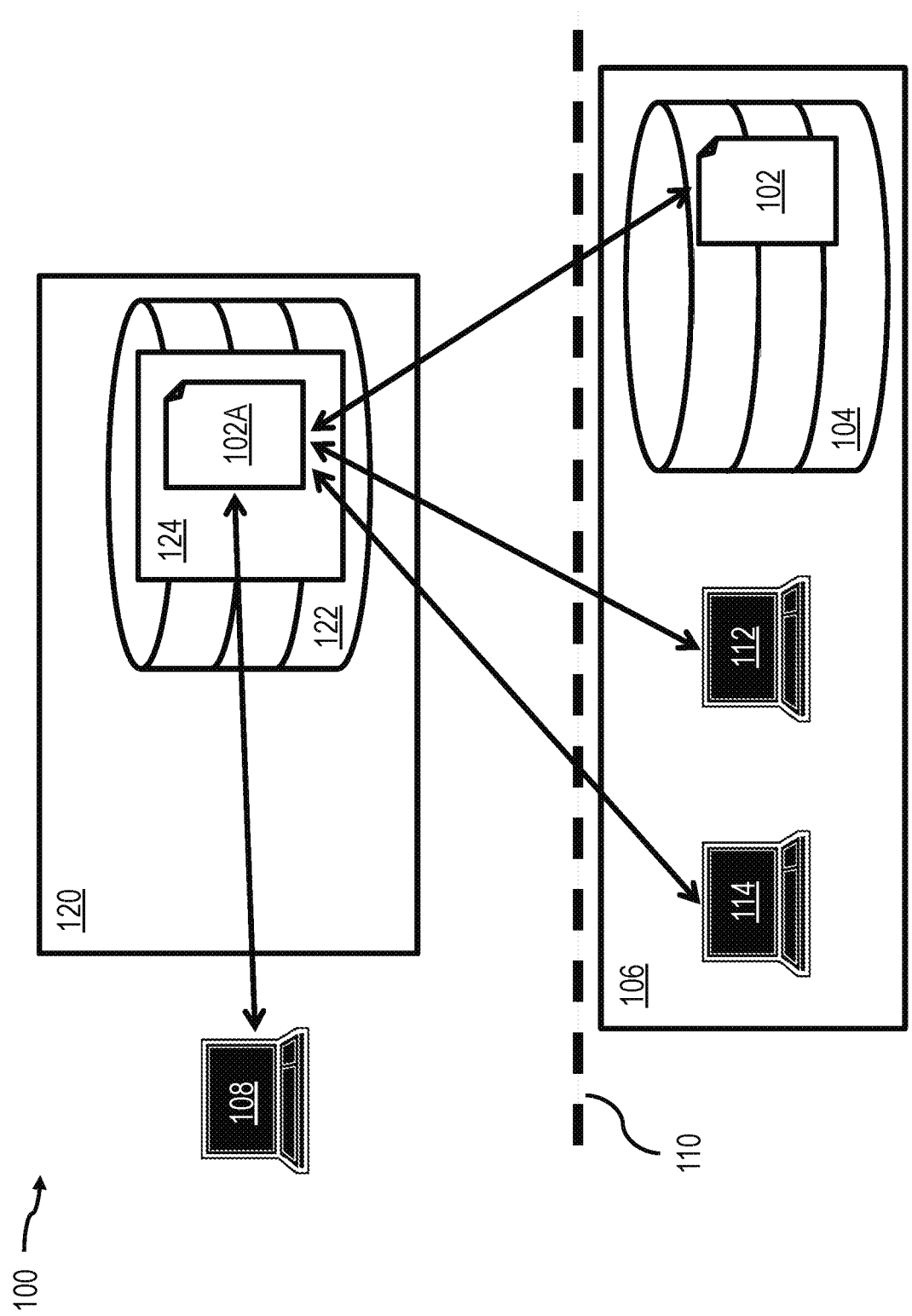
FIG. 1 shows a diagram illustrating features of a CMS architecture consistent with implementations of the current subject matter.

As described in greater detail below, synchronization can be supported for individual and multiple files, folders, and folder hierarchies between the "local" and "remote" repositories. As an illustrative example, FIG. 1 shows a diagram of a synchronization architecture 100 in which local content 102 stored in a repository 104 of a local platform 106 of a CMS is restricted from being accessed by an external user 108 who is outside of a firewall 110. A first internal user 112 who is inside the firewall 110 has access permissions (which can include one or more of ownership, authorship, read/write permission, etc.) to the local content 102. A second internal user 114 who is inside the firewall 110 can optionally be restricted from accessing the local content 102, for example due to a differing role or permission set of the second internal user 114. Also as shown in FIG. 1, a remote platform 120 of the CMS can include tenant-isolated access to a remote repository 122. As used herein, the term "local content" refers generally to content retained in the local repository 104 and available for synchronization with a tenant 124. The local content 102 can include a single content file or multiple content files. Alternatively or in addition, the local content 102 can be synchronized at a higher directory level, such as for example by linking one or more folders, file trees, other directory structures, etc. such that a linked folder, file tree, other directory structure, etc. as well as any other content items included within the linked folder, file tree, other directory structure, etc. are replicated in the tenant as the remote copy 102A. For a synchronized multi-level directory structure, file tree, set of folders, etc., any sub-directories, branches of the file tree, sub-folders, etc. are also replicated to the remote copy 102A and synchronized.

Figure 2:
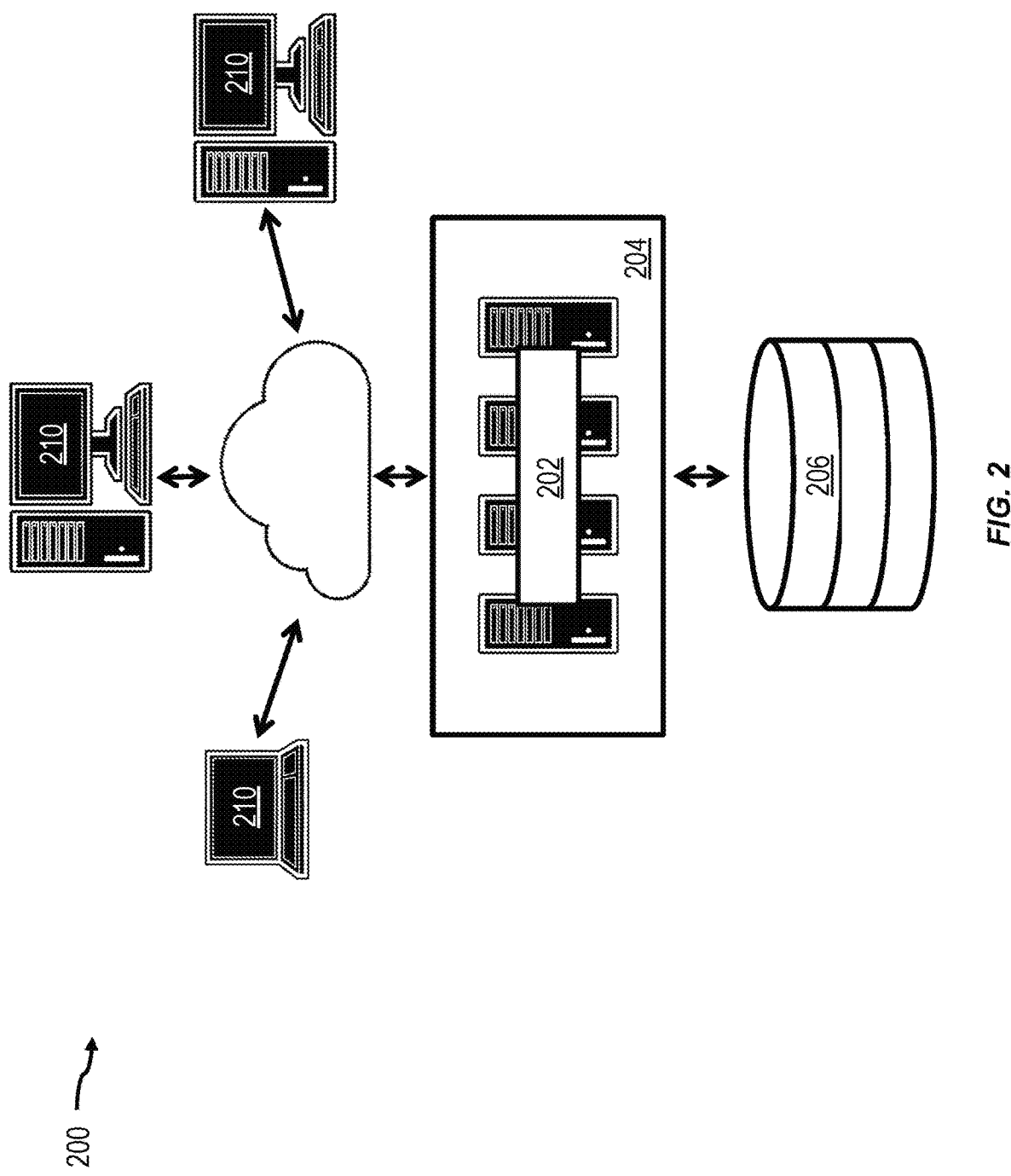
FIG. 2 shows a diagram illustrating features of multi-tenancy software platforms that may relate to one or more implementations of the current subject matter.

Tenant-isolated access refers to a multi-tenancy arrangement in which an platform of a software application 202 runs on a server (or multiple servers) to support multiple client-organizations (tenants). Multi-tenancy differs from multi-instance architectures where separate software instances (or hardware systems) operate on behalf of different client organizations. FIG. 2 shows a diagram 200 illustrating a basic multi-tenant arrangement. In a multi-tenant architecture, the software application 202 running on the one or more servers 204 virtually partitions its data and configuration within one or more data storage systems 206 accessible by the one or more servers 204. The one or more data storage systems 206 can include one or more hard drives, flash memory, RAM, optical storage, or any other kind of information storing device. Each of multiple client organizations can optionally work with a customized virtual application instance supported by one of multiple tenants 210. Data in the one or more repositories 206 that are specific to a given tenant of the multiple tenants 210 are accessible only to authorized users of that tenant. Given this definition of a multi-tenancy arrangement, it will be readily understood that references herein to a remote repository 122 are intended to refer broadly to data accessible to and isolated within a tenant of a multi-tenant implementation of a software as a service offering of a software application 202, which in this example is a content management system.

Referring again to FIG. 1, the first internal user 112 can create a linkage between the local content 102 in the repository 104 of the local platform 106 of the CMS and a remote copy 102A of the local content 102. The remote copy 102A can exist in the remote repository 122 and be isolated to provide access only to authorized users of a specific tenant 124 of which the first internal user 112 is an authorized user. The remote copy 102A can include both the content of the local content 102 as well as a synchronized set of common metadata. The synchronized set of metadata are synchronized between the remote copy 102A and the local content 102 in the repository 104 of the local platform 106 as discussed in greater detail below.

This synchronization can occur automatically. Communications necessary to ensure synchronization of changes to the synchronized set of metadata and/or to the content of the local content 102 or the remote copy 102A of the content are initiated from the local platform 106 of the CMS. In other words, changes made to the content item (e.g., changes in content or metadata relating to the local content 102) from inside the firewall 110 are pushed to the tenant 124 to be reflected in the remote copy 102A while changes to the remote copy 102A occurring within the tenant 124 are pulled to the local platform 106 of the CMS to be reflected in the local content 102. Exchange of the synchronization information can occur over secure communication channels, such as for example HTTPS connections or the like. Because initiation of all communication actions necessary to synchronize changes made to either of the remote copy 102A or the local content 102 occur from the local platform 106, opening of the firewall 106 is unnecessary. The first internal user (and optionally other users of the local platform 106 with administrator or ownership rights to the content item) can determine one or more parameters that dictate what information can be synchronized (e.g. to ensure the sensitive content remains local), how conflicting changes to one or the other of the remote copy 102A and the local content 102 are resolved, etc.

Consistent with some implementations of the current subject matter, a synchronization process can include establishing authentication between the tenant 124 and the local platform 106. In some examples, authentication can be established through interaction of the first internal user 112 with one or more user interface elements, such as for example a window, navigation pane, or other display feature including one or more user interface elements, an inline prompt, etc. The first internal user 112 can be requested to supply authentication credentials on a first request to set up a synchronization between a content item held within the firewall-protected platform of the content management system, and the authentication credentials can be saved, for example in a secure credentials store or the like for future synchronization actions. Optionally, the authentication credentials can be checked for accuracy when they are entered to prevent, for example, an incorrect password, username, or other credentials, from being saved in the secure credentials store. In some examples, an oAuth implementation or the like can be used to establish authentication of the first internal user 112.

The first internal user 112 can be allowed to synchronize the local content 102 between the firewall-protected local platform 106 and at least one tenant 124 to which the first internal user 112 has authorized access. The tenant 124 can have multiple users connecting to it at the same time to allow collaboration. One or more of the multiple users can be an external user 108 or a second internal user 114 within the local platform 106. The first internal user 112 can optionally be limited to storing the credentials for only a tenant 124.

As a further explanation, any given internal user (e.g. the first internal user 112) can have two user identifications, one for the tenant 124 and one for the local platform 106. Multiple internal users can have permissions to access, edit, etc. the local content 102 via the local platform. Similarly, one or more internal users 112, 114 as well as one or more external users 108 who have or are given access to the tenant 124 can access the remote copy 102A of the content item. The first internal user 112 can be capable of synchronizing the local content 102 with any tenant (e.g. remote instance of the CMS) to which the first internal user 112 has authorized access to create and update content.

Consistent with some implementations, the first internal user 112 (e.g. the user creating a synchronized link for content 102 to the remote) can be granted permissions for access to sites or folders within a tenant 124 at a finer level of granularity than per tenant. For example, a tenant 124 can include one or more "sites" as well as folders or other directory structures that can exist within separate sites in the tenant 124. Permissions can be defined at a site level and at a folder or subfolder level. The first internal user 112 can, for example, be able to select a first folder (e.g. "Folder A") as a target for synchronizing but not a second folder (e.g. "Folder B"), even if both Folder A and Folder B are inside the same site in the same tenant 124.

Similarly, while the tenant 124 can contain many sites, the first internal user 112 may only be able to see a subset of those sites, and may be able to create and update content in an even smaller subset of those sites. Implementations of the current subject matter can support access controls such as these or other comparable scenarios, and in general can allow a local user to sync content only to a location in the remote (tenant+site+folder) to which they have create and edit permissions.

Once authentication between the tenant 124 and the local platform 106 is established, the first internal user can select one or more content items 102 to be linked between the local platform 106 and the tenant 124. In one example consistent with implementations of the current subject matter, this selection can be accomplished through a local document library, which generally refers to a user interface view of a file directory structure that enables user navigation through content items accessible within the repository 104 of the local platform 106. The first internal user 112 can select one or more folders or files (e.g. content items—the term files is also herein interchangeably with content items) to synchronize through interactions with document library functionality.

Synchronization between local content 102 and a remote copy 102A of that content can be based on a concept of synchronization sets ("synch-sets"), which generally include a group of one or more files, folders, etc. that sync to a particular location in the remote platform 120. As used herein, a location refers to any of a tenant, a site, a folder, a directory tree, a document, etc. If the first internal user 112 selects multiple files for linking between the local platform 106 and the tenant 124, these multiple files can be grouped together as a single synch-set. If the first internal user 112 selects only one file, a synch-set containing a single node will be created. The term node is used herein to refer to a file, a folder, or other content items as it is represented in a repository (either the local repository 104 or the remote repository 122). A user that creates a synch-set (e.g., the first internal user 112 in the example described here) owns that synch-set, which uses that user's remote credentials to synchronize the files included in the synch-set between the local repository 104 and the remote repository 122. Linkages between content in the local repository 104 and the tenant can be established for individual files or for folders or other file directory structures that can contain multiple individual files and/or subfolders.

As noted above, synchronization of changes occurring to either of a remote copy 102A or the local content 102 itself occurs via a push/pull process that is initiated from the local platform 106. Pushing and pulling of changes can be accomplished on a synch-set by synch-set basis. In some examples, synchronization management can be accomplished on an individual file basis while the synch-sets are managed by the system. As an example of this approach, a user can request a synchronization of a file or other content item located within a larger file structure (e.g. a folder, directory tree, etc.) individually. Synchronization of the larger file structure (e.g. to synchronize all changes to all content items within it) can occur under automatic control. Alternatively or in addition, the selected content item or items can be individually synchronized between the local and remote repositories. In other implementations, administrator and/or user level synch-set management features can be made available. Synchronization management actions (such as for example un-synchronizing a remote copy 102A and local content 102 in the local repository 104) are generally required to be performed at the same file directory level included by the first internal user 112 within the original linkage. For example, if the first internal user 112 links a folder (e.g. a file directory structure that can contain one or more files or sub-folders) as part of a synch-set, un-synchronizing of content within the folder occurs atomically for all the contents of the folder rather than on an item or sub-folder basis for content or subfolders within the folder.

Synchronization management features can include associated a marker aspect with local content 102 when the local content is added to a synchronization set. When unsynchronization occurs, the marker aspect associated with the local content 102 is removed and an unsynchronization record can be added to the local audit log. Deletion of the local content 102 from the local repository 104 can also result in the unsynchronization record being added to the local audit log 302. When the CMS local platform 106 queries the local audit log for changes, it finds the local content unsynchronization record and pushes it to the tenant 124 just as any other change. The remote copy 102A can optionally be deleted upon receipt at the tenant 124 of the unsynchronization record. Alternatively, the remote copy 102A can be retained at the tenant. However, further changes to the remote copy 102A are not pulled back to the local content node 102, as the synchronization link has been removed, or in some cases the local content 102 has been deleted.

In some examples, local content 102 that is synchronized with a remote copy 102A at the tenant 124 can be locked such that only changes to the remote copy 102A are allowed. In other words, while the local content node 102 is synchronized with the remote copy 102A, the local node 102 is available only for read access. This approach can assist in maintaining consistency in versions of the content 102. Both external users 108 and first and second internal users 112 and 114 (as well as other internal and external users) can collaborate using a collaboration site established in the tenant 124. The local platform 106 of the CMS can thereby serve as the system of record for changes to the content 102 while the tenant 124 serves as a system of engagement where collaborative changes to the remote copy 102A of the content occur. The changes to the remote copy 102A are periodically pulled back to the local platform for recording and versioning. The remote copy 102A can hold the most up-to-date version of the content. The local content 102 can "lag behind" the remote copy 102A, so after a change is made in the remote repository 122 there exists a short period of time during which the local content 102 does not reflect the latest version in the tenant 124.

Multiple local repositories can synchronize content independently of one another to multiple tenants in the remote. It is also possible for multiple distinct local repositories to synchronize content into different locations in a single tenant 124. Accordingly, consistent with illustrative implementations of the current subject matter, pull synchronization can involve communications between the local platform 106 and the tenant 124 at two levels of granularity. For communication efficiency and data security reasons, a local repository 104 can make periodic requests to the tenant 124 for a high-level "manifest" of relevant changes made to items stored in the remote platform 120. This manifest can include a coarse-grained definition of any content item changes that are relevant for that particular local repository 104 but need not include any information on changes that are relevant to other local repositories besides the local repository 104. For example, the coarse-grained listing can optionally include identifiers of content items that have changed, and/or identifiers of synchronization sets containing content items that have changed without including specifics about the changes themselves. The specifics can be requested to be sent in a second communication using the identifiers provided in the manifest. Examples of irrelevant changes can include, but are not limited to, changes to content items synchronized with other local repositories. The server or servers hosting the multi-tenant, remote instance of the CMS can support this functionality, for example through storage in tenant audit logs 312 of a source repository identifier for each change and through audit log queries which can be filtered by the source repository identifier. For example, the source repository identifier, which identifies a local repository 104 to which a copy 102A in the remote repository 122 is linked, can be provided when the synch-set is initially created in the tenant, site, folder, etc. in the remote and never changes.

Consistent with some implementations of the current subject matter, a workflow can be synchronized between a local ECM and a remote ECM, by the partitioning, distribution and isolation of workflow components among a local workflow and a remote workflow. Content and metadata associated with the content that are processed in the local workflow are synchronized with a remote copy of the content and metadata that are processed in the remote workflow, leveraging a remote synchronization mechanism, as described in further detail below.

Another advantage consistent with some implementations of the current subject matter is that both document content and potential workflow actions are always atomic. For example, when a document is updated in the remote and the remote workflow is finished, the local version of the document will be synchronized before the local workflow will continue 'flowing' or otherwise be resumed, such that the latest version is always available to users either in the local workflow or remote workflow.

Figure 3:
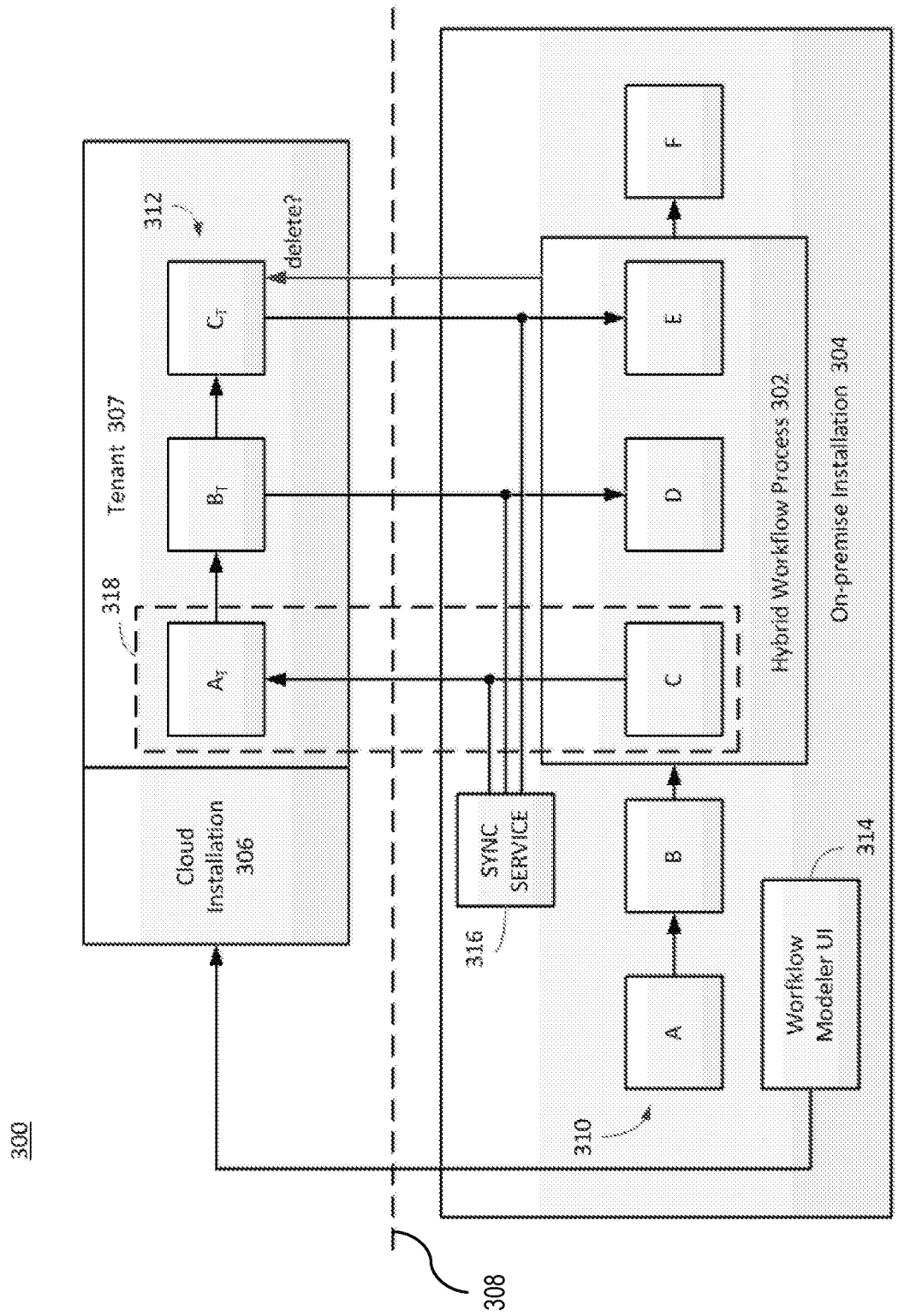
FIG. 3 shows a diagram illustrating features of a hybrid workflow that synchronizes a local workflow with a remote workflow.

FIG. 3 illustrates a hybrid workflow process 302 in a content management system 300. The content management system 300 includes a local platform 304 and a remote platform 306 of the content management system. The local platform 304 is protected by a firewall 308, and which protects the local platform during data transmission with the remote platform 306 and any other external networks that are outside the protections of the firewall 308. The local platform 304 further includes a local repository that stores local content, which includes both content and metadata associated with the content, and which can be stored as a document, a file, or other form of data.

The remote platform 306 can include one or more tenants 307, and each tenant can include one or more tenant computing systems or virtual machines, which can be organized in a multi-tenancy remote architecture. Each tenant 307 can include a computer connected with a network. The remote platform 306 can also include a remote repository that stores remote content and metadata, as well as remote copies of local content and metadata.

Both the local platform 304 and the remote platform 306 of the content management system 300 can include any number of user computers that receive user input, and by which a user can perform actions on one or more documents or other files as a part of the workflow that is defined at the local platform 304. At least one user computer at the local platform 304 can include a workflow modeler and user interface 314 to model the workflow and define the steps of the workflow. The modeler and user interface 314 receives input for selecting a destination and network of the files in the remote workflow 312, and accordingly, input for selecting one or more assignee(s) in the tenant of the selected network for the remote workflow 312.

The local platform 304 executes a local workflow 310 (workflow states A, B, C, D, E, and F) of the workflow, while the remote platform 306 executes a remote workflow 312 (workflow states AT, BT, and CT) of the workflow. Each workflow state in the local workflow 310 and remote workflow 312 represents an action, such as "review," "approve," or "complete," for example, in the workflow. According to a workflow defined at the local platform 304, a designated user/tenant of the remote platform 306 can open a task, review a document(s), and approve or reject the task or make other changes to the document(s).

A portion of the local workflow 310 can include the hybrid workflow process 302. A communication channel implemented by a synchronization service 316 synchronizes the local workflow 310 and the remote workflow 312 in the hybrid workflow process 302. The synchronization service 316 sets up a number of synch-sets 318 to synchronize service tasks, actions and changes to designated content. Each synch-set 318 defines a workflow pair having a local workflow state, an associated remote workflow state, and the communication channel between them. Via the synch-sets 318, service tasks, actions and changes are pushed from the local platform 304 to the remote platform 306, and pulled from the remote platform 306 by the local platform 304 through firewall 308. When the workflow is defined, an aspect is added as a set of properties to documents, files and/or other content that are designated as part of a hybrid workflow. As used herein, "aspect" refers to a piece of metadata that is part of the metadata definition for each of the documents, files and/or other content. The aspect identifies the documents, files or other content (and associated metadata) that are part of the hybrid workflow, and facilitates retrieval by a workflow manager computer (not shown in FIG. 3) of the local workflow associated with the identified content. Further, the aspect allows state to be shared between the local workflow and the remote workflow via the remote sync mechanism, including a state that represents when a task or step is completed.

Figure 4:
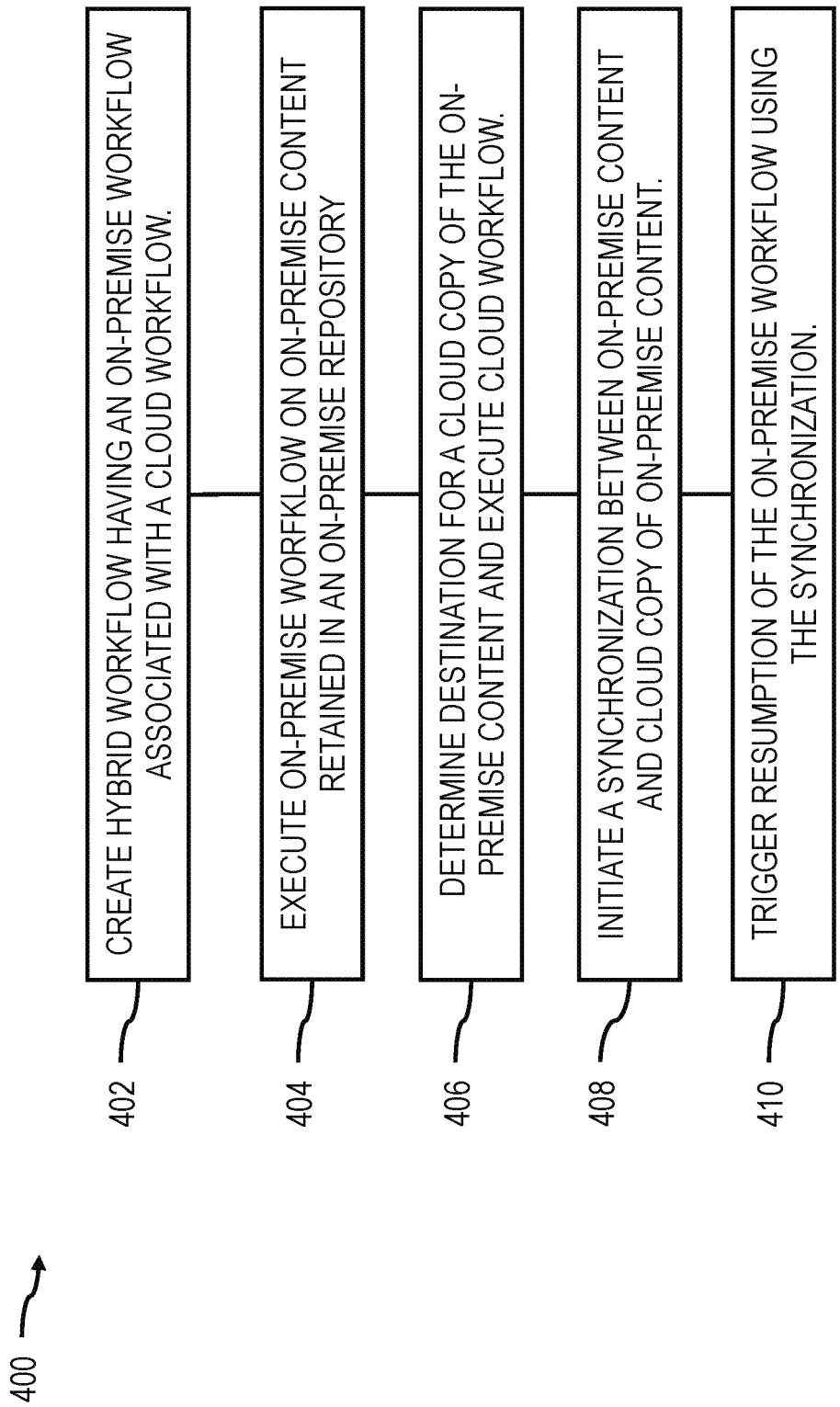
FIG. 4 shows a process flow diagram illustrating aspects of a method having one or more features consistent with implementations of the current subject matter.

FIG. 4 shows a process flow chart 400 illustrating features that can be included in a method consistent with implementations of the current subject matter. At 402, a hybrid workflow is created in a local platform of a content management system. The workflow includes a remote workflow and a local workflow relating to local content retained in a local repository managed by the local platform of the content management system. At 404, the workflow is executed by the local platform of the content management system.

At 406, a destination is determined for a remote copy of the local content. The destination defines a tenant, site or folder managed by a remote platform of the content management system. The destination is separated from the local platform of the content management system by a firewall of the local platform. A remote sync mechanism allows synchronization of content and metadata between the local platform and the destination of the remote platform. At 408, a synchronization is initiated between the local content and the remote copy of the local content via the remote sync mechanism. The synchronization includes reflecting a change to either of the local content or the remote copy in the other of the local content and the remote copy, and the change includes a content change and/or a metadata change.

At 410, upon detection that the remote workflow has been completed by the destination using the remote copy of the local content, a resumption of the local workflow is triggered, based on the synchronization between the local content and the remote copy of the local content. In other words, changes made to the copy of the local content are synchronized back to the local content, and the local workflow continues based on the synchronized version. At this step, the local workflow is triggered when a synch state definition, which is part of the aspect, is synchronized between the remote workflow and the local workflow, and the status of completion of the remote workflow is detected. The local platform receives this decision from the aspect of the document in the remote platform, looks up the workflow associated with a synchronization state definition (SSD), an aspect that represents the state of synchronization, and generates a signal for the local workflow to resume. This further alerts a user to the new task, with information about the decision in the remote workflow.

Figure 5:
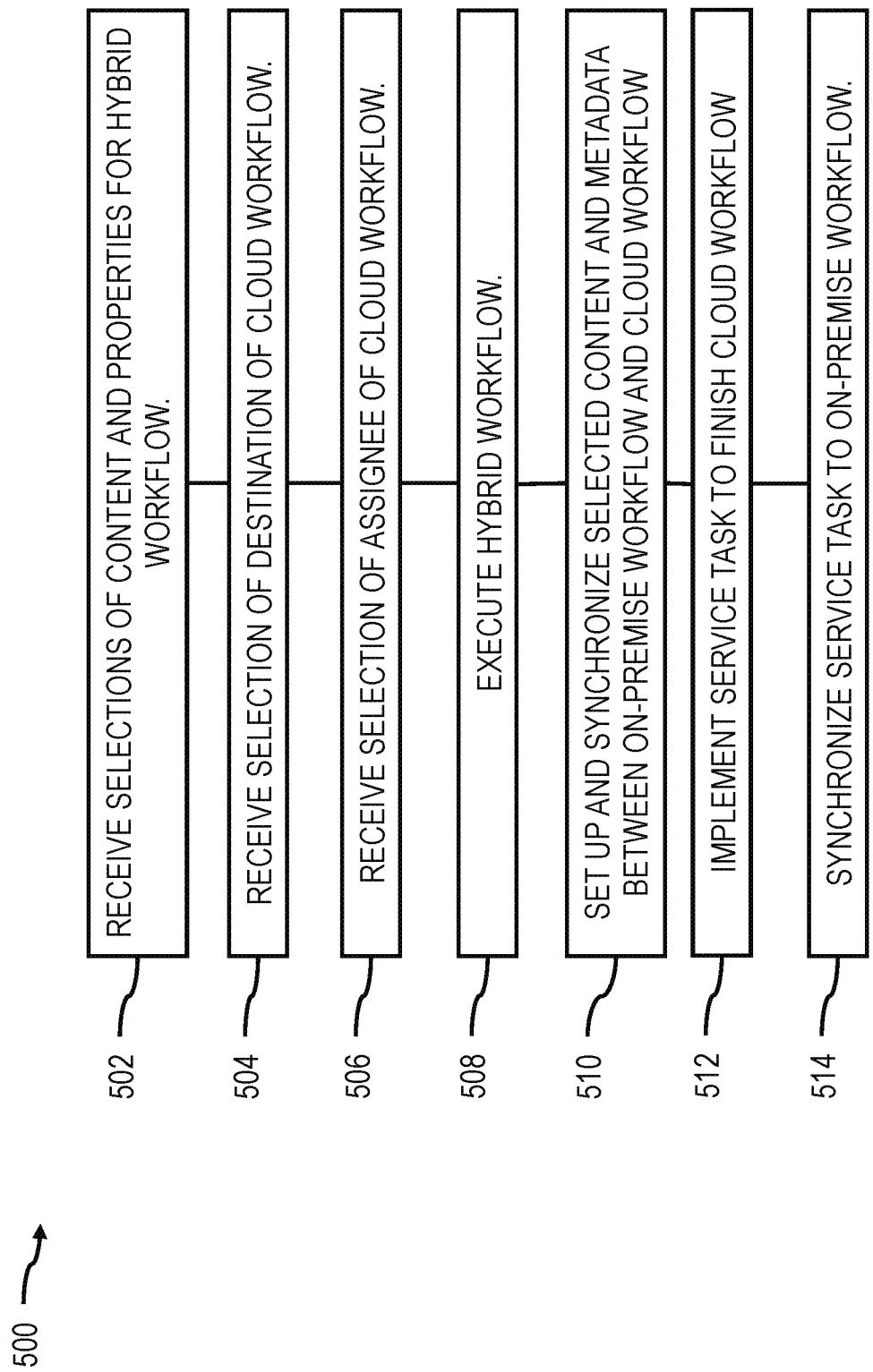
FIG. 5 shows another process flow diagram illustrating aspects of a method having one or more features consistent with implementations of the current subject matter.

FIG. 5 shows another process flow chart 500 illustrating features that can be included in a method consistent with implementations of the current subject matter. At 502, selections of content and properties (i.e., description, due date, priority, etc.) of the content are received at a local platform of a CMS. The files to be included in the workflow are also selected. The workflow includes a local workflow relating to local content retained in a local repository managed by the local platform of the CMS, as well as a remote workflow in communication with the local workflow by a remote sync mechanism, yet separated by a firewall around the local platform. At 504, a selection of a destination of the content is received by the local platform. The destination includes a tenant, site or folder of a multi-tenant system managed by a remote platform of the content management system. Accordingly, a user can choose what data is processed where, i.e. in the local workflow or remote workflow, or both.

At 506, one or more assignees are selected from the remote platform of the CMS. Each assignee can be selected by a local user after the network, site, and folder are selected. Thereafter, at 508, the hybrid workflow is started with the local workflow on the local platform. At 510, a service task in the workflow sets up the hybrid workflow. The service task includes an aspect, which is added to all documents in the hybrid workflow package. The aspect contains the workflow information and properties (i.e., description, due date, priority, etc.) and a workflow ID for the local workflow. A synch-set is also created for all documents in the hybrid workflow.

The service task is associated with a synchronization service, which synchronizes the selected content and its associated metadata between the local workflow and the remote workflow. The synchronization service pushes changes to any content and metadata to the remote platform from the local platform, as content and aspects are created local. Synchronization from the remote workflow is accomplished by first checking whether a synchronization state definition (SSD) of the document was started in the local workflow. If there is already a remote workflow running for the local workflow ID associated with a document or other content, the document is added to the remote workflow package, which can be considered as a synch-set of documents or other content items relevant to the remote workflow. Generally, contents of a remote workflow package associated with a SSD are synchronized at the same time as the SSD, thereby advantageously reducing, minimizing, or even eliminating time that the remote workflow does not contain documents required for its completion. If no remote workflow is running, a new remote workflow is started, the properties of the local workflow are pushed to the new remote workflow, and the document is added to the remote workflow package. Finally, the SSD is updated, and indicates that the remote workflow has started.

Once the remote workflow has started, at 512 a service task is implemented for the remote user who has been selected as an assignee. The remote user opens the service task, reviews the document(s), and selects an outcome for the service task, such as, for example, approving or rejecting the document or content item associated with the service task. The decision (approve/reject) is copied to the aspect associated with the document, and the SSD is set to indicate that the remote workflow is finished.

At 514, the service task of the remote workflow is synchronized to the local workflow. The SSD is synched to trigger the local workflow, which can occur in a manner similar to the synchronization of content between the local and remote repositories. The SSD can in some example be considered as another content item that is itself synchronized between the repositories. The outcome from the aspect is stored in the local workflow, by looking up the workflow associated with the SSD and aspect of the document. This signals for the local workflow to resume, and the local user is informed about the outcome made in the remote platform.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean "based at least in part on" such that an unrecited feature or element is also permissible. Other implementations than those described herein may be within the scope of the following claims.

What is claimed is:

1. A computer implemented system in which a local platform is communicatively coupled to a remote platform, the system comprising:
    computer hardware comprising one or more processors configured to perform operations of a content management system, the operations comprising:
    initiating synchronization between a local content retained in a local repository managed by the local platform and a remote copy of the local content at a destination comprising a location managed by the remote platform;
    determining one or more changes to content or metadata in at least one of the local content and the remote copy of the local content;
    locking a local workflow from change to allow for changes to the remote copy in response to initiating the synchronization;
    executing a remote workflow associated with the local workflow, in response to a triggering of the remote workflow by the local platform before the local workflow continues after being unlocked;
    communicating a notification indicating that the remote workflow has been completed;
    resuming the local workflow, in response to determining the synchronization between the local content and the remote copy of the local content has been completed;
    wherein the synchronization comprises:
        pushing an aspect and corresponding changes of the local content to the remote platform; and
        pulling the aspect and the corresponding changes of the remote copy of the local content from the remote platform to the local platform; and
        wherein the aspect identifies a synch state definition of the local content and whether the local content is part of a hybrid workflow.

2. The computer implemented system of claim 1, wherein the local platform of the content management system is protected from access by external users by a firewall, and the operations further comprise locking the local workflow from change to enable changes to the remote copy.

3. The computer implemented system of claim 1, wherein the aspect is added to one or more local content associated with the hybrid workflow, the aspect comprising a record that designates the local content for the remote workflow.

4. The computer implemented system of claim 3, wherein a selection of content and properties of the local content is included in the hybrid workflow.

5. The computer implemented system of claim 1, wherein one or more assignees of a service task are designated to be executed on the remote copy of the local content, the one or more assignees being associated with the remote platform of the content management system.

6. The computer implemented system of claim 5, wherein the service task further designates an outcome that, once completed by the one or more assignees, triggers the resumption of the local workflow.

7. The computer implemented system of claim 5, wherein the service task is associated with a synchronization service, the synchronization service synchronizing the one or more changes to the content or the metadata between the local content and the remote copy.

8. A computer-implemented method comprising:
    initiating synchronization between a local content retained in a local repository managed by a local platform and a remote copy of the local content at a destination comprising a location managed by a remote platform of thea content management system;
    determining one or more changes to content or metadata in at least one of the local content and the remote copy of the local content;
    locking a local workflow from change to allow for changes to the remote copy in response to initiating the synchronization;
    executing a remote workflow associated with the local workflow, in response to a triggering of the remote workflow by the local platform before the local workflow continues after being unlocked;
    communicating a notification indicating that the remote workflow has been completed;
    resuming the local workflow, in response to determining the synchronization between the local content and the remote copy of the local content has been completed;
    wherein the synchronization comprises:
        pushing an aspect and corresponding changes of the local content to the remote platform; and
        pulling the aspect and the corresponding changes of the remote copy of the local content from the remote platform to the local platform; and
        wherein the aspect identifies a synch state definition and whether the local content is part of a hybrid workflow.

9. The computer-implemented method in accordance with claim 8, further comprising:

triggering, upon detection that the remote workflow has been completed by the location using the remote copy of the local content, a resumption of the local workflow using the synchronization between the local content and the remote copy of the local content.

10. The computer-implemented method in accordance with claim 8, further comprising:

adding the aspect to all local content associated with the hybrid workflow, the aspect comprising a record that designates the local content for the remote workflow.

11. The computer-implemented method in accordance with claim 8, further comprising:

designating, based on the destination, one or more assignees of a service task to be executed on the remote copy of the local content, the one or more assignees being associated with the remote platform of the content management system.

12. The computer-implemented method in accordance with claim 11, wherein the service task further designates an outcome that, once completed by the one or more assignees, triggers the resumption of the local workflow.

13. The computer-implemented method in accordance with claim 12, wherein the service task is associated with a synchronization service, the synchronization service synchronizing the one or more changes to content or metadata between the local content and the remote copy.

14. The computer-implemented method in accordance with claim 8, further comprising receiving a selection of content and properties of the local content to be included in a hybrid workflow.

15. A non-transitory computer program product including program code, which when executed by one or more processors, causes the one or more processors to perform operations comprising:

executing at least part of a workflow by a local platform of a content management system, the workflow comprising a remote workflow and a local workflow relating to local content retained in a local repository managed by the local platform of the content management system;

determining a destination for a remote copy of the local content, the destination comprising a location managed by a remote platform of the content management system;

initiating a synchronization between the local content and the remote copy of the local content;

locking the local workflow from change to allow for changes to the remote copy in response to initiating the synchronization before the local workflow will continue after being unlocked, the synchronization comprising reflecting a change to either of the local content or the remote copy in an other of the local content and the remote copy, the change comprising at least one of a content change and a metadata change;

in response to detection that the remote workflow has been completed by the location using the remote copy of the local content, the local workflow is resumed using the synchronization between the local content and the remote copy of the local content;

wherein the synchronization comprises:

pushing an aspect and corresponding changes of the local content to the remote platform; and pulling the aspect and the corresponding changes of the remote copy of the local content from the remote platform to the local platform; and wherein the aspect identifies a synch state definition of the local content and whether the local content is part of a hybrid workflow.

16. The non-transitory computer program product in accordance with claim 15, wherein the local platform of the content management system is protected from access by external users by a firewall.

17. The non-transitory computer program product in accordance with claim 15, wherein the aspect is added to at least one local content associated with the workflow, the aspect comprising a record that designates the local content for the remote workflow.

18. The non-transitory computer program product in accordance with claim 15, wherein based on the destination, one or more assignees of a service task are assigned to be executed on the remote copy of the local content, the one or more assignees being associated with the remote platform of the content management system.

19. The non-transitory computer program product in accordance with claim 18, wherein the service task further designates an outcome that, once completed by the one or more assignees, triggers the resumption of the local workflow.

* * * * *